Nov. 21, 1961   C. G. MUNTERS   3,009,540
METHOD OF AIR CONDITIONING

Filed Feb. 17, 1958   2 Sheets-Sheet 1

INVENTOR.
CARL GEORG MUNTERS
BY

United States Patent Office 3,009,540
Patented Nov. 21, 1961

3,009,540
METHOD OF AIR CONDITIONING
Carl G. Munters, Danderydsvagan 3, Danderyd,
Stockholm, Sweden
Filed Feb. 17, 1958, Ser. No. 715,729
Claims priority, application Sweden Feb. 19, 1957
9 Claims. (Cl. 183—114.2)

The present invention relates to air conditioning and more particularly to a method of regenerating a moisture sorption mass in an air conditioning system.

It has heretofore been proposed to condition an enclosure by passing separate streams of outside air and air from an enclosure in counter-current moisture and heat exchange relationship. In such an air conditioning system a stream of outside air is first dehumidified by contact with the moisture sorption mass then cooled by contact with a heat exchange mass. The dried cooled air is then further cooled by evaporative cooling to produce the temperature required for comfort conditions before delivery to the enclosure.

The air from the enclosure is first coled by evaporating moisture therein and then passed through the heat exchange mass in heat exchange with the stream of outside air being conditioned. The stream of air from the enclosure after it leaves the heat exchange mass is heated to a high temperature by the application of external heat which lowers its relative humidity. The heated air is then passed through the sorption mass to regenerate the mass by removing the absorbed moisture therefrom. The moist air leaving the sorption mass at relatively high temperature is discharged to the outside ambient atmosphere. Thus, all of the air used to regenerate a sorption mass is heated to a high temperature and the air leaving the mass and the heat contained therein is discharged from the system.

One of the objects of the present invention is to provide an improved method of conditioning air with the aid of a system having a regenerative moisture sorption mass by which the sorption mass is partially regenerated without the addition of any external heat.

Another object is to provide an improved method of conditioning air by passing it successively through moisture sorption and heat exchange masses and in which air from the heat exchange mass is utilized to partially regenerate the sorption mass without the addition of any external heat.

Another object is to regenerate the moisture sorption mass in an air conditioning system of the type indicated in a plurality of steps, one of which utilizes air flowing in the system to partially regenerate the mass without the addition of any external heat and the other of which requires a corresponding lesser amout of external heat to complete the regeneration of the mass.

Another object is to provide an improved method of regenerating a moisture sorption mass in an air conditioning system of the type indicated by utilizing the heat in the air leaving the sorption mass to preheat the air entering the mass.

Still another object is to provide an improved method in an air conditioning system of the type indicated which utilizes the sensible heat generated in the system, reduces the waste heat discharged from the system and thereby produces an increased coefficient of performance of the system.

These and other objects will become more apparent from the following description and drawings in which like reference characters denote like parts throughout the several views. It is to be understood, however, that the drawings are for the purpose of illustrating the method of the present invention and are not for the purpose of limiting the invention, reference being had for this purpose to the appended claims:

In the drawings:
FIGURE 1 is a diagrammatic view of an air conditioning apparatus for carrying out the method of the present invention and showing the separate streams of air for regenerating the sorption mass in a plurality of steps;

Figure 1:
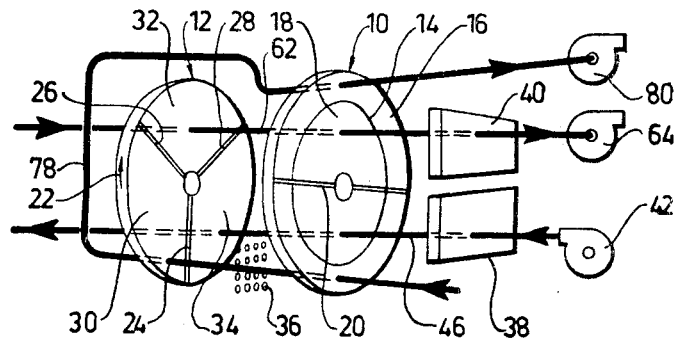

The method of the present invention is directed to regenerating the moisture sorption mass used in an air conditioning system to improve the coefficient of performance of the system. The method is directed more specifically to regenerating the moisture transfer mass in a plurality of separate steps. In one step, the mass is partially regenerated by media in the system without the addition of any external heat. In the other step, the regeneration of the mass is completed by the addition of external heat, but with a lesser amount of heat corresponding to the regeneration performed in the first step without heat.

The type of air conditioning system to which the present invention is applied has an air permeable regenerative moisture sorption mass to dehumidify the air to be conditioned and an air permeable heat exchange mass to cool the dehumidified air. The air permeable moisture transfer mass is or contains a hygroscopic material which absorbs or adsorbs moisture from the air and is referred to in the specification and claims as a sorption mass. Moisture flows to or from the sorption mass depending upon whether the vapor pressure of the moisture in the air, which is functionally related to the relative humidity of the air, is higher or lower than the vapor pressure of the moisture in the hygroscopic sorption mass. As moisture is removed from the air by the sorption mass, its latent heat is converted to sensible heat with a corresponding increase in the temperature of the air leaving the mass. The sensible heat in the dry hot air leaving the sorption mass is then transferred to the heat exchange mass to provide relatively cool dry air. The air permeable heat transfer mass is composed of a non-hygroscopic material to and from which heat flows from a higher to a lower temperature without any material transfer of moisture.

In accordance with the method of the present invention, separate streams of air are passed through each of a plurality of adjacent sorption and regenerating zones in the sorption mass and the mass is continuously moved through the successive zones without any material transfer of heat. Streams of air including the stream of air to be conditioned also flow through a plurality of adjacent zones in the heat transfer mass and the heat transfer mass continuously moves through the successive zones to exchange heat between the air in the different streams.

Air in one of the streams leaving the heat exchange mass is passed through one of the regenerating zones of the moisture transfer mass to partially regenerate the sorption mass without the addition of any external heat. The regenerating air from the heat exchange mass may comprise the stream of air to which heat is transferred from air being conditioned; or the air from the heat exchange mass may constitute the dried and cooled conditioned air. In either case, the air from the heat exchange mass has a relative humidity and corresponding vapor pressure characteristic to cause moisture to flow from the sorption mass to the air. When the stream of air used to partially regenerate the sorption mass is the one to which heat is transferred from the air to be conditioned in the heat exchange mass, the transferred heat raises its temperature sufficiently as to reduce its relative humidity and vapor pressure below that required to cause moisture to flow from the sorption mass to the air in the stream. When the dry and cooled conditioned air is used, its relative humidity and vapor pressure is sufficiently low as to cause moisture to flow from the sorption mass to the air stream. Thus, the sorption mass is partially regenerated by air in the system without the addition of any external heat.

A second stream of regenerating air is heated to a high temperature and passed through an adjacent regenerating zone of the sorption mass to complete the regeneration of the mass. However, a smaller quantity of heat is required due to the partial regeneration by the first air stream so that less external heat is required than when the sorption mass is regenerated in a single step. The reduction in the amount of heat required corresponds to the amount of partial regeneration produced by the first regenerating step without the addition of any external heat.

Furthermore, the method of the present invention utilizes the heat in the second stream of regenerating air leaving the sorption mass to preheat the stream prior to external heating to improve the coefficient of performance of the system. This additional saving of heat is accomplished by initially passing the second stream of regenerating air leaving the sorption mass in heat exchange with the portion of the stream flowing toward the heater to preheat the air. For this purpose, a heat exchange mass is continuously moved between the entering and leaving portions of the second regenerating stream of air. This heat exchange may be performed by a separate heat exchange mass or by using different zones of the heat exchange mass acting between air to be conditioned and the first stream of regenerating air.

In the drawings, FIGURE 1 illustrates an air conditioning system for performing the method steps of the present invention. The air conditioning system in FIGURE 1 is intended to operate in a warm climate to condition air in an enclosure and, therefore, must maintain a temperature in the enclosure which is lower than the outside ambient air and must continuously remove moisture from the enclosure to produce comfort conditions in the enclosure.

The apparatus of the air conditioning system is illustrated diagrammatically in FIGURE 1 as comprising two rotatable wheels generally indicated by the reference characters 10 and 12. The wheel 10 is a heat exchanger which transfers sensible heat between air streams passing through different zones thereof. The heat exchange wheel 10 comprises an air permeable mass which is divided into an outer annular section 16 and an inner circular section 18 by a casing having aligned cylindrical partitions 14 at each side thereof. The casing also has a radially extending partition 20 on each side of the wheel as well as the cylindrical partition 14 so that the wheel passes through four individual separated passages during rotation. Each of the partitions 14 and 20 has sealing members engaging the sides or faces of the air permeable mass of the wheel to prevent leakage between adjacent passages.

Thus, two inner semi-circular passages or zones are formed in the wheel 10 on opposite sides of the partition 20 within the periphery of the circular partition 14. These passages or zones will be hereinafter referred to as the inner lower passage and the inner upper passage, respectively. Heat is exchanged by the wheel 10 from the air streams passing through these inner upper and lower passages. The two other semi-annular passages or zones of the heat exchange wheel 10 defined by the partitions 14 and 20 will hereinafter be referred to as the outer bottom passage and outer top passage, respectively. Heat is exchanged between the air in two separate streams passing through the outer bottom and outer top passages of the heat exchanger 10, but there is no material transfer of heat between the separate passages with the exception of unavoidable and negligible losses between the stream at opposite sides of the cylindrical and radial partitions 14 and 16.

The heat transfer mass in the heat exchange wheel 10 may be composed of fibers or foils of a non-hygroscopic material and such foils may be corrugated to provide axial ducts extending longitudinally of the wheel. A preferred form of heat exchange wheel 10 is of the type illustrated and described in prior application for U.S. Letters Patent Serial No. 542,544 filed October 25, 1955, now abandoned, and the heat exchange mass in said wheel may be constructed in accordance with the disclosure in my prior application for U.S. Letters Patent Serial No. 442,686, filed July 12, 1954, now abandoned. The wheel 10 is mounted to rotate at a relatively high speed, and may rotate either clockwise or counterclockwise.

The wheel 12 is a moisture exchanger for transferring moisture between air in a plurality of different streams without any substantial transfer of heat. The direction of rotation of the moisture transfer wheel 12 is clockwise as indicated by the arrow 22 and the wheel rotates at a relatively low speed of the order of a few revolutions per hour. Thus, the speed of rotation of the moisture transfer wheel 12 is only a fraction of that of the heat exchange wheel 10. The moisture sorption mass in the wheel 12 also may be in the form of a fiber or foil similar in form to that used in the heat exchange wheel 10, but comprises a hygroscopic material which can withstand the high temperature of the media passing through. A suitable material is corrugated asbestos paper which is impregnated with a moisture absorbing substance. The same material also may be used in the heat exchange wheel 10 and impregnated with a substance to prevent the absorption of moisture.

The moisture transfer wheel 12 may be of the type shown and described in my prior application for U.S. Letters Patent Serial No. 442,687 filed July 12, 1954 now abandoned in the form of a wheel which moves in a circular path; or may be of the type illustrated and described in my application for U.S. Letters Patent Serial No. 485,632 filed February 2, 1955 now Patent Number 2,925,880, in which the sorption mass is in the form of articulated sections movable on a track in a path which does not necessarily have to be circular. Thus, the movement of the sorption mass may be linear instead of circular.

The casing surrounding the wheel 12 is provided with three radially extending partitions 24, 26 and 28 having sealing engagement with the faces of the wheel and forming three sector-shaped passages 30, 32 and 34. Thus, each passage 30, 32 and 34 extends radially from the axis of the wheel toward its periphery. The partitions 24 and 26 defining the sector 30 are connected to the portions of the partitions 14 and 20 at the sides of the heat exchange wheel 10 which define the outer lower passage and thus, form a continuation of this passage. The partitions 26 and 28 defining the sector 32 of the moisture transfer wheel 12 are connected to the portions of the partitions 14 and 20 defining the inner upper passage through the heat exchange wheel 10 and constitutes a continuation of this passage. The partitions 24 and 28 forming the sector 34 of the moisture transfer wheel 12 are connected to the portions of the partitions 14 and 20 defining the inner lower passage through the heat transfer wheel 10 and constitute a continuation of this passage. The apparatus includes a heater 36 in the passage between the outer lower section of the heat exchange wheel 10 and the sector 30 of the moisture transfer wheel 12. The apparatus also includes evaporating pads 38 and 40 in the passages to and from the inner lower section and inner upper section of the heat transfer wheel 10 for evaporating water into the air passing through said passages.

In the form of apparatus illustrated in FIGURE 1, outside air to be conditioned is propelled by a fan 64 to flow in a stream 62 through the drying sector or zone 32 of the moisture transfer wheel 12 for dehumidifying the air, through the inner upper section or zone of the heat transfer wheel 10 to cool the dehumidified air and then through the evaporating pad 40 to further cool the air before delivery to the enclosure. A corresponding amount of air from the enclosure is propelled by a fan 42 in a stream 46 through the evaporating pad 38 to cool the air to a low temperature by evaporative cooling, through the inner lower section of the heat exchanger wheel 10 where the air is heated by exchange of sensible heat with the stream of outside air flowing to the enclosure and then through the sector 34 of the moisture transfer wheel 12 to partially regenerate the moisture sorption mass. A second regenerating stream 78 of outside air is propelled by fan 80 through the outer bottom section of the heat transfer wheel 10, heater 36, sector 30 of the moisture transfer wheel 12 to complete the regeneration of the moisture sorption mass and then back through the outer upper section of the heat transfer wheel 10 and fan 80 back to the atmosphere. Thus, the heat in the second stream of regenerating air leaving the moisture sorption mass is transferred to the same stream of air flowing through the heat transfer wheel 10 to preheat the air prior to its contact with the heater 36. Thus, the waste heat in the regenerating air stream is utilized to reduce the amount of external heat which must be applied by the heater 36.

With the arrangement illustrated in FIGURE 1, the first stream of regenerating air from the heat exchange wheel 10 used to partially regenerate the sorption mass in moisture exchange wheel 12 is heated by the dehumidified air being conditioned. This heat is transferred to the air in the first regenerating stream 46 in the heat exchange wheel 10 to produce a relative humidity lower than that of the air entering the sector 32 whereby to cause at least part of the moisture absorbed from the air to be conditioned to flow to the first stream of regenerating air.

Figure 2:
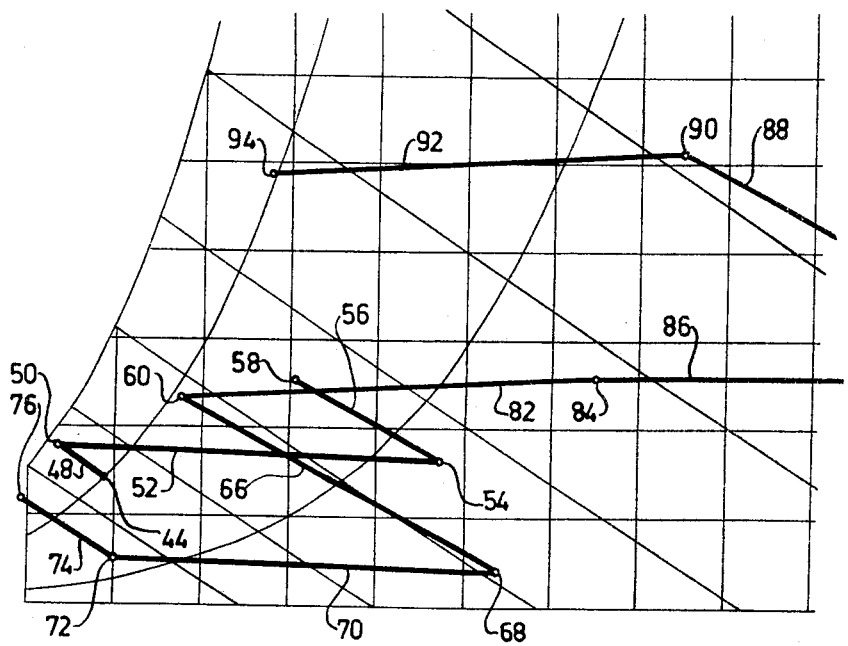
FIGURE 2 is a psychrometric chart showing the changes in the temperature, absolute moisture content and relative humidity of the separate air streams as they flow through the apparatus.

The thermodynamic characteristics of the different streams of air passing through the wheels 10 and 12 which cause moisture to flow from the air being conditioned to the sorption mass and then from the sorption mass to the air from the heat exchanger mass is illustrated in the psychrometric chart in FIGURE 2. In the psychrometric chart the ordinate represents the absolute moisture content of the air in any suitable scale such as grams of water per kilograms of dry air. The abscissa indicates the dry bulb temperature. The inclined lines represent the entholpy and wet bulb temperatures. The curved lines indicate the relative humidity conditions of air at any point on the chart and the relative humidity varies from a saturated condition or 100% relative humidity on the left to a decreasing percentage to the right.

By reference to the psychrometric chart, it will be observed that the stream of air 46 from the enclosure has an initial condition corresponding to the point 44 representing a temperature of 25.5° C. dry bulb and 18.5° C. wet bulb. As the air from the enclosure flows through the evaporating pad 38 its temperature is reduced by evaporative cooling and its moisture content increased along the enthalpy line 48 of the chart to the point 50 indicating a temperature of 19.5° C. dry bulb and 18.5° C. wet bulb. Hereinafter, the respective dry bulb and wet bulb conditions for different points in the diagram will be given in parenthesis and rounded out to the nearest one half degree.

During the passage of the cooled air stream 46 through the inner lower passage of the heat exchanger 10, it is heated along line 52 on the chart to the point 54 (68.5° C., 30.5° C.) by the exchange of heat from the air being conditioned. As will be observed from the chart the line 52 is not parallel with the abscissa but leans somewhat downwardly from left to right which represents the unavoidable losses due to leakage and a limited moisture transfer. It also will be observed that the heat of the air in the stream 46 by heat exchange with the air being conditioned lowers the relative humidity and vapor pressure of the air considerably below the relative humidity of the outside air to be conditioned as indicated by the point 60 (35° C., 25.5° C.). In other words, the point 54 is considerably to the right of the point 60 indicating a much lower relative humidity and vapor pressure. As each part of the moisture sorption mass adjacent the partition 26 moves toward the right to the partition 28 it increases its moisture content until the vapor pressure in the air and sorption mass are in equilibrium at a much higher relative humidity and vapor pressure than indicated by the point 54 on the chart. Therefore, as the air leaving the heat exchanger 10 flows through the sector 34 of the moisture sorption mass, moisture will flow from the higher vapor pressure in the mass to the lower vapor pressure in the air stream to partially regenerate the mass. This partial regeneration or moisture pick-up from the moisture transfer wheel 12 is indicated on the chart by the line 56 which terminates at the point 58 (49.5° C., 29.5° C.). The first stream of regenerating air leaving the sector 34 of the sorption mass is then exhausted to the atmosphere. The line 56 is not exactly parallel with the enthalpy line, but leans somewhat downwardly in a direction from the point 54 to the point 58 indicating the unavoidable air leakage and heat transfer. Thus, the sorption mass in the moisture transfer wheel 12 is partially regenerated by air from the heat exchange mass without the addition of any external heat.

The stream 62 of outdoor air to be conditioned is assumed to have the condition corresponding to the point 60 (35° C., 25.5° C.) on the chart. This condition corresponds to a relative humidity of 48% so that the outside air has both a high temperature and moisture content. The assumed starting condition of the outdoor air obviously may vary in both directions, but the condition selected as an example is a relatively difficult one from an air conditioning standpoint.

The stream 62 of outdoor air first passes through the sector 32 of the moisture transfer wheel where it is dehumidified along the line 66 to the point 68 (75° C., 27° C.). The stream 62 of air to be conditioned continues to flow through the inner upper passage of heat exchange wheel 10 where it contacts the heat transfer mass of the heat exchange wheel which has been previously cooled by the air in the stream 46 leaving the enclosure. The air to be conditioned is then cooled along the line 70 of the chart to the condition corresponding to the point 72 (26.5° C., 13° C.). It will be noted that the two lines 52 and 70 in the diagram correspond to one another and indicate the exchange of heat between the air flowing toward the enclosure and the air flowing from the enclosure. The air is then further cooled by evaporation in the pad 40 along the line 74 to acquire its final condition before entry into the enclosure and which condition is represented by the point 76 (15° C.). It will be noted that point 76 has a lower temperature and absolute humidity than point 50 which represents the condition of the air upon leaving the enclosure.

The second stream 78 of regenerating air from the outside flows through the outer bottom section of exchanger 10 and sector 30 of moisture transfer wheel 12 and has a lesser volume than the other two air streams. If the volume of the other two air streams is assumed to be 100%, the volume of the second regenerating air stream may have a volume of about 40%. This second stream of regenerating air obviously has the same starting condition as the outside air to be conditioned which is indicated in the diagram at the point 60 (35° C., 25.5° C.). The temperature of this second stream of regenerating air is increased as it passes through the outer bottom passage of the heat exchange wheel 10 as indicated by the line 82 on the chart to the point 84 (88° C., 36.5° C.). This increase in temperature or preheating takes place by heat exchange with the same stream of air leaving the moisture transfer wheel 12. The preheated air in the second regenerating stream is then further heated along the line 86 in the chart by contact with the heating element 36. The line 86 in the chart terminates at a point located outside the chart having a lower relative humidity than that corresponding to the point 68 (150° C., 45° C.). The second regenerating stream of air evaporates moisture as it passes through the sector 30 of the moisture sorption mass which is indicated by the line 88 on the chart to the point 90 (99° C., 44° C.). The second stream of regenerating air then passes through the upper outer passage of the heat exchange wheel 10 where it exchanges its heat to the incoming portion of the regenerating air streams. This exchange of heat occurs along the line 92 of the chart to the point 94 (46° C., 36° C.). It will be noted that the lines 82 and 92 correspond to each other in offset relationship indicating the exchange of heat between the two air streams flowing countercurrent to each other.

Figure 3:
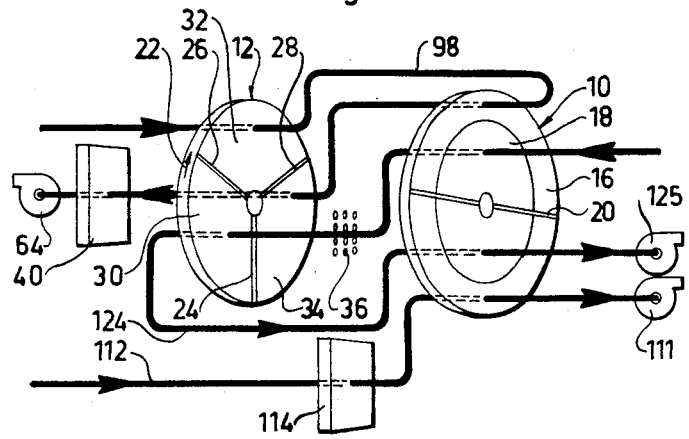
FIGURE 3 is a diagrammatic view of an air conditioning apparatus of modified form for carrying out the method of the present invention.

Another embodiment of apparatus for carrying out the steps of the method of the present invention is illustrated in FIGURE 3 of the drawings. In this apparatus arrangement, the same heat exchange and moisture transfer wheels 10 and 12 are used, but the air in the enclosure is continuously circulated in a closed path through the moisture and heat transfer wheels. The stream of air 98 from the enclosure first passes through the sector 32 of the moisture transfer wheel 12 which dehumidifies the air, through the outer and upper section of the heat transfer wheel 10 to cool the air and then back through the sector 34 of the moisture transfer wheel to partially regenerate the sorption mass therein. As the air in the stream 98 passes through the sector 34 of the sorption mass it is cooled by the evaporation of moisture from the mass. The air in stream 98 is then passed through an evaporative pad 40 to further cool the air before it is returned to the enclosure by the fan 64.

Sensible heat in the air stream 98 is transferred to a stream 112 of outside air in the heat exchange wheel 10. The stream 112 of outside air passes through an evaporating pad 114 to cool outside air by evaporative cooling and then through the outer lower section of the heat exchange wheel 10 back to the atmosphere by means of a fan 111. Thus, the sensible heat in the air stream 98 is transferred to the air stream 112 and dissipated to the atmosphere.

The second stream 124 of regenerating air is drawn in from the outside and first passed through the inner and upper section of the heat transfer wheel 10 where it is pre-heated, through the heater 36 where it is heated to a higher temperature, through the sector 30 of the moisture transfer wheel 12 and then back through the inner lower section of the heat transfer wheel 10. The air is then exhausted to the atmosphere by the fan 125. Thus, the moisture transfer wheel 12 is partially regenerated by the air to be conditioned as it leaves the heat transwer wheel 10 and the second stream of regenerating air is preheated by heat in the air stream leaving the moisture sorption mass.

Figure 4:
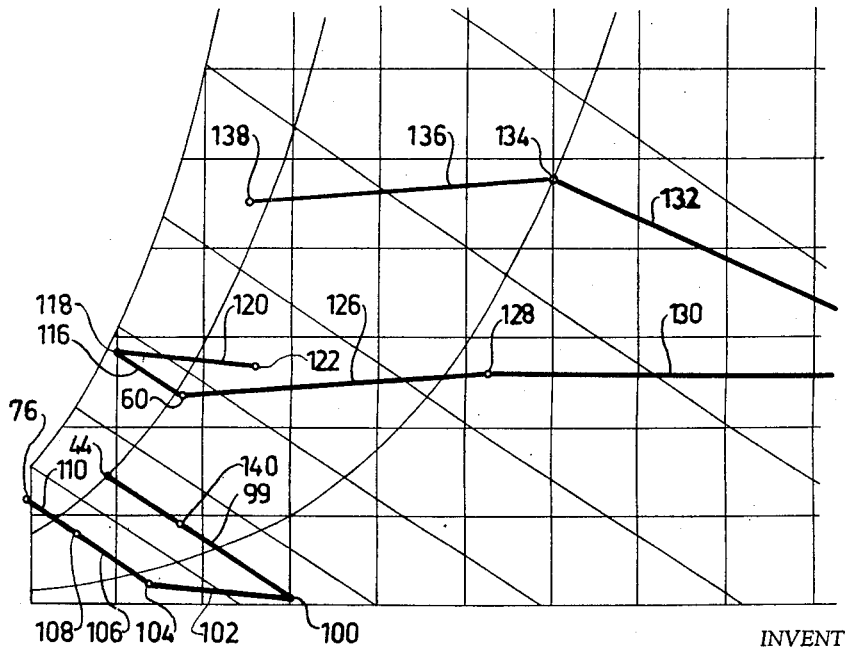
FIGURE 4 is a psychrometric chart showing the changes in the temperature, absolute moisture content and relative humidity of the air in the seperate streams flowing in the apparatus illustrated in FIGURE 3.

As shown in the chart in FIGURE 4, the room air leaving the enclosure has an initial condition corresponding to the point 44 and a final condition indicated by the point 76 on the chart, the same as in the first embodiment. The outdoor air is also assumed to have the same conditions corresponding to the point 60. The room air is dehumidified in the moisture transfer wheel 12 as indicated by the line 99 extending from the point 44 to the point 100 (49° C., 19° C.). The dehumidified air passes through the outer upper passage of the heat exchange wheel 10 where it is cooled by heat exchange with the stream of outdoor air 112 as indicated by the line 102 to the point 104 (30.5° C., 13° C.). The dehumidified and cooled air now has low moisture content and relative humidity and a corresponding low vapor pressure to cause vapor to flow from the moisture sorption mass to the moisture transfer wheel 12 to air in stream 98 as it passes through the wheel. This regenerating moisture transfer is indicated by the line 106 on the chart from point 104 to the point 108 (21° C., 15° C.). It will be observed that the line 106 representing the moisture pick-up from the moisture transfer wheel 12 corresponds with the portion of line 99 between the points 44 and 140 representing substantially half of the total moisture absorbed from the air being conditioned. Thus, the conditioned air is utilized to partially regenerate the moisture transfer wheel 12 without the addition of any external heat. Furthermore, the evaporation of moisture from the moisture transfer wheel 12 cools the air stream 98. After leaving the moisture transfer wheel 12, the stream of air 98 is further cooled by evaporative cooling as it passes through the evaporative pad 40 and this additional cooling is indicated on the chart by the line 110 to the final condition 76. The conditioned air is then delivered to the enclosure.

The stream of outside air 112 for cooling stream 98 in heat exchanger 10 first passes through the evaporative pad 114 where it is cooled by the evaporation of moisture therein as indicated by the line 116 on the chart in FIGURE 4 to the point 118 (26.5° C., 25.5° C.). The stream 112 of outdoor air then passes through outer bottom section of heat exchange wheel 10 where it picks up heat as indicated by the line 120 on the chart to the point 122 (44.5° C., 29° C.). This stream of air is then exhausted back to the atmosphere.

The second stream 124 of regenerating air from the outdoor atmosphere first passes through the inner upper passage of heat exchange wheel 10 where it is preheated as indicated by the line 126 on the chart to the point 128 (74° C., 34° C.). The air stream 124 is then further heated by contact with the heating element 36 which is indicated by the line 130 on the chart until it acquires temperature of 120° C. located outside the area of the chart and a low relative humidity considerably below the point 100. The second stream 124 of regenerating air, having a volume of about 30% of either of the other two air streams, then passes through sector 30 of the moisture transfer wheel 12 where it evaporates the moisture in the wheel, as indicated by the line 132 on the chart which terminates at the point 134 (82° C., 41° C.). The stream of air leaving the moisture transfer wheel 12 then passes through the inner lower passage of the heat transfer wheel 10 and exchanges its heat to the portion of the stream entering the inner upper section of the heat transfer wheel. This exchange of heat is indicated by the line 136 on the chart which terminates at the point 138 (43.5° C., 35° C.). It will be observed that the lines 126 and 136 correspond with each other and indicate the transfer of heat from one portion of the stream to the other.

Thus, the moisture transfer wheel 12 in the arrangement illustrated in FIGURE 3 is regenerated in a plurality of steps one of which utilizes air from the heat exchange mass to partially regenerate the wheel and the other of which utilizes external heat. It will be observed by reference to the line 99 on the chart in FIGURE 4 that nearly half of the moisture is removed from heat transfer wheel 12 by the first stream of regenerating air without the addition of any external heat which together with the heat exchange between the air entering and the air leaving the second regenerative stream will produce a coefficient of performance as high as .7.

It will now be observed that the present invention provides an improved method for partially regenerating the moisture sorption mass in an air conditioning system without the addition of any external heat. It will also be observed that the present invention provides an improved method of partially regenerating the sorption mass without the addition of external heat by utilizing air from the heat exchange mass. It will also be observed that the present invention regenerates the moisture sorption mass in an air conditioning system in a plurality of steps in which the sorption mass is partially regenerated in one step without the addition of any external heat and in the other step by the use of a lesser amount of external heat corresponding to the partial regeneration in the first step. It will still further be observed that the present invention provides an improved method in an air conditioning system which utilizes the heat generated in the system and reduces the waste heat discharged from the system to increase the coefficient of performance of the system.

While two embodiments of apparatus for carrying out the method of the present invention are herein illustrated and described, it will be understood that further changes may be made in the construction and arrangement of elements without departing from the spirit or scope of the invention. Therefore, without limitation in this respect the invention is defined by the following claims.

I claim:

1. In the method of conditioning air by passing a stream of air to be conditioned through a regenerative moisture sorption mass to dehumidify the air, the improvement which comprises regenerating the moisture sorption mass in a plurality of successive steps, the first of said steps consisting of passing a stream of heated air having a lower relative humidity than the air to be conditioned through the sorption mass to partially regenerate the latter, and then passing a second stream of regenerating air through the sorption mass, heating the air in said second stream of regenerating air to a temperature substantially higher than that of the first stream with external heat prior to its passage through the sorption mass to complete its regeneration, and utilizing the heat acquired by the air to be conditioned while passing through the sorption mass to heat said first stream of air to enable it to carry out said first regenerating step without the addition of any external heat.

2. In a method of conditioning air by passing a stream of air to be conditioned through a regenerative moisture sorption mass to dehumidify the air and then through a heat exchanger to cool the air, the improvement which comprises regenerating the sorption mass in a plurality of successive steps by moving the regenerative moisture sorption mass through a dehumidifying zone and successive regenerating zones, the first step of which consists in passing a stream of heated regenerating air having a lower relative humidity than the air to be conditioned from the heat exchanger through the first regenerating zone adjacent the dehumidifying zone to partially dehumidify the sorption mass, then passing a second stream of regenerating air through a second regenerating zone remote from the dehumidifying zone, heating the air in said second regenerating stream to a temperature substantially higher than that of the first stream with external heat prior to its passage through the sorption mass to further regenerate the mass, and utilizing the heat acquired by the air to be conditioned while passing through the sorption mass to heat said first stream of air to enable it to carry out said first regenerating step without the addition of any external heat.

3. A method of conditioning an enclosure in accordance with claim 1, which comprises passing said second stream after leaving the sorption mass in heat exchange with the same stream prior to the external heating thereof whereby to utilize at least a portion of the heat therein to preheat said second stream of air.

4. A method of conditioning an enclosure in accordance with claim 2, which comprises passing said second stream after leaving the sorption mass in heat exchange with the same stream prior to the external heating thereof whereby to utilize at least a portion of the heat therein to preheat said second stream of air.

5. In a method of conditioning an enclosure by passing a stream of air successively through a regenerative moisture sorption mass to dehumidify the air and through a heat exchange mass to cool the dehumidified air, the improvement which comprises regenerating the moisture sorption mass in a plurality of successive steps, the first of which consists in passing a first stream of regenerating air through the sorption mass, moving the heat exchange mass between the stream of air to be conditoned and first stream of regenerating air to reduce the relative humidity and vapor pressure of the regenerating air below the vapor pressure in the sorption mass and cause it to partially regenerate the mass, then passing a second stream of regenerating air through the sorption mass, heating said second stream of air by external heat prior to its contact with the mass to complete the regeneration of the mass whereby to reduce the amount of external heat required and utilizing the heat acquired by the air to be conditioned while passing through the sorption mass to heat said first stream of air to enable it to carry out said first regenerating step without the addition of any external heat.

6. A method of conditioning an enclosure in accordance with claim 5 which comprises passing the stream of externally heated air leaving the sorption mass in heat exchange with the stream entering the mass prior to external heating to utilize at least a portion of the heat therein to preheat the stream of air.

7. In a method of conditioning air in an enclosure with the aid of a regenerative moisture sorption mass and a heat exchange mass, the improvement which comprises regenerating the sorption mass in a plurality of steps by continuously moving successive portions of the sorption mass through a dehumidifying zone and successive regenerating zones, continuously moving the heat exchange mass through a plurality of zones, passing a stream of outside air to be conditioned through the dehumidifying zone of the sorption mass and one zone of the heat exchange mass, passing a stream of air from the enclosure through another zone of the heat exchange mass in heat exchange relation with the air to be conditioned while maintaining it at a lower relative humidity than the air to be conditioned and then through the first regenerating zone of the sorption mass to partially regenerate the mass by utilizing the heat acquired from the air to be conditioned while passing through said dehumidifying zone, then passing a second stream of outside air through the second regenerating zone of the sorption mass, and heating the air in said last named stream prior to contact with the sorption mass to a temperature substantially higher than that of the air passing through the first regenerating zone to complete the regeneration of the mass.

8. A method of conditioning an enclosure with the aid of a system having a regenerative sorption mass and a heat exchanger which comprises circulating a first stream of air in a closed path through a dehumidifying zone of the sorption mass to dehumidify the air, then through the heat exchanger to cool said stream of air and dissipate the heat of sorption while maintaining it at lower relative humidity than the air to be conditioned and then back through a second zone of the sorption mass adjacent the first zone to evaporate moisture therefrom and partially regenerate the mass by utilizing the heat acquired by said stream of air while passing through the dehumidifying zone, passing another stream of regenerating media through a third zone of the sorption mass, heating the media passing through the third zone of the mass to a substantially higher temperature than said first air stream to complete the regeneration of the mass, and continuously moving each portion of the sorption mass through the first, second and third zones successively.

9. In a method of conditioning an enclosure with the aid of a regenerative moisture sorption mass and a heat exchange mass, the improvement which comprises regenerating the sorption mass in a plurality of steps by continuously moving successive portions of the sorption mass through a dehumidifying zone and successive regenerating zones, continuously moving successive portions of the heat exchange mass through a plurality of zones, the first of which steps consists in passing a stream of air from the enclosure through the dehumidifying zone of the sorption mass, one of the zones of the heat exchange mass, then back through a regenerating zone of the sorption mass next adjacent the dehumidifying zone in the direction of movement of the mass while maintaining it at a lower relative humidity than the air from the enclosure to partially regenerate the mass by utilizing the heat acquired by said stream while passing through said dehumidifying zone, passing a stream of outside air through another zone of the heat exchange mass, then through a second regenerating zone of the sorption mass and then back through the heat exchange mass in heat exchange relation with itself, heating said stream of outside air between the heat exchange and sorption masses to a substantially higher temperature than the air from the enclosure to complete the regeneration of the sorption mass, and passing a second stream of outside air through another zone of the heat exchange mass in heat exchange relation with the air from the enclosure passing through the first zone thereof.

References Cited in the file of this patent

UNITED STATES PATENTS

| | | |
|---|---|---|
| 1,397,091 | Douglass | Nov. 15, 1921 |
| 2,286,920 | Miller | June 16, 1942 |
| 2,700,537 | Pennington | Jan. 25, 1955 |